US 10,647,473 B2

(12) United States Patent
Blair et al.

(10) Patent No.: US 10,647,473 B2
(45) Date of Patent: May 12, 2020

(54) MODULAR TANKS

(71) Applicant: Greenco Water Pty Ltd, Melbourne (AU)

(72) Inventors: Nigel Blair, Malvern East (AU); Simon McMahon, South Melbourne (AU)

(73) Assignee: GREENCO WATER PTY LTD (AU)

( * ) Notice: Subject to any disclaimer, the term of this patent is extended or adjusted under 35 U.S.C. 154(b) by 66 days.

(21) Appl. No.: 14/651,400

(22) PCT Filed: Dec. 12, 2013

(86) PCT No.: PCT/AU2013/001455
§ 371 (c)(1),
(2) Date: Jun. 11, 2015

(87) PCT Pub. No.: WO2014/089626
PCT Pub. Date: Jun. 19, 2014

(65) Prior Publication Data
US 2015/0314913 A1 Nov. 5, 2015

(30) Foreign Application Priority Data

Dec. 12, 2012 (AU) .............................. 2012905471
Jul. 16, 2013 (AU) .............................. 2013902634

(51) Int. Cl.
B65D 21/08 (2006.01)
B65D 25/16 (2006.01)
(Continued)

(52) U.S. Cl.
CPC ............ *B65D 21/083* (2013.01); *B65D 11/02* (2013.01); *B65D 11/10* (2013.01); *B65D 25/16* (2013.01);
(Continued)

(58) Field of Classification Search
CPC ...... B65D 21/083; B65D 25/16; B65D 11/02; B65D 90/046; B65D 90/08; B65D 90/024;
(Continued)

(56) References Cited

U.S. PATENT DOCUMENTS 2,388,297 A * 11/1945 Slaughter ............ B29C 65/5085
428/53
2,861,277 A 11/1958 Hermann
(Continued)

FOREIGN PATENT DOCUMENTS

AU 2008203248 A1 2/2010
CN 1930059 A 3/2007
(Continued)

*Primary Examiner* — Robert Poon
(74) *Attorney, Agent, or Firm* — Dureska & Moore, LLC; David P. Dureska; David J. Danko

(57) ABSTRACT

A modular tank comprises one or more wall modules coupled together and one or more liner bags supported by the one or more wall modules for the containment of liquid, in particular water. The wall modules can be planar or curved and the edges of the wall modules are coupled together via joining members. The modular tank comprises one or more layers of the wall modules. One or more of the wall modules comprise a hole and the one or more liner bags, which can be coupled together, comprise one or more parts that protrude through the holes in the wall modules to support the liner bags.

13 Claims, 13 Drawing Sheets

(51) Int. Cl.
  *B65D 6/00* (2006.01)
  *B65D 8/00* (2006.01)
  *B65D 90/04* (2006.01)
  *B65D 90/08* (2006.01)
  *B65D 88/08* (2006.01)
  *B65D 90/02* (2019.01)
  *E03B 3/03* (2006.01)

(52) U.S. Cl.
  CPC .......... *B65D 88/08* (2013.01); *B65D 90/024* (2013.01); *B65D 90/046* (2013.01); *B65D 90/08* (2013.01); *E03B 3/03* (2013.01); *Y02A 20/106* (2018.01); *Y10T 29/49948* (2015.01)

(58) Field of Classification Search
  CPC ......... B65D 90/023; B65D 88/08; F16B 2/22; F16B 5/0004; F16B 5/0607; F16B 5/00; F16B 5/0012; F16B 5/0016; F16B 5/002; F16B 5/0028; F16B 5/0032; F16B 5/0036; F16B 5/0056; F16B 5/0068; F16B 5/0084; F16B 5/06; F16B 2005/0678
  USPC ..... 220/4.12, 4.16, 683, 685, 691, 682, 684, 220/4.28
  See application file for complete search history.

(56) References Cited

U.S. PATENT DOCUMENTS

| | | | | |
|---|---|---|---|---|
| 3,044,658 A * | 7/1962 | Combs | ................... | B65D 7/12 217/69 |
| 3,348,459 A | 10/1967 | Harvey | | |
| 3,460,860 A * | 8/1969 | Stevens, Jr. | ............. | E04D 1/365 160/231.2 |
| 3,819,079 A | 6/1974 | Levens | | |
| 3,854,269 A * | 12/1974 | Hancock | ................... | F16B 2/22 220/683 |
| 4,099,355 A * | 7/1978 | Strunk | ...................... | E04B 1/80 52/404.3 |
| 4,594,829 A * | 6/1986 | Herrgord | ............. | E04B 2/7405 52/282.3 |
| 4,760,932 A | 8/1988 | Rhodes, Jr. | | |
| 5,706,624 A * | 1/1998 | Lipson | ................... | E04B 1/3211 403/403 |
| 7,761,963 B2 * | 7/2010 | Koch | ..................... | A61G 17/00 220/4.28 |
| 8,430,155 B2 | 4/2013 | Gocze | | |
| 2004/0217118 A1* | 11/2004 | Nash | ...................... | B65D 88/08 220/495.01 |
| 2005/0011899 A1* | 1/2005 | Saitoh | ................... | B65D 88/08 220/565 |
| 2010/0213201 A1 | 8/2010 | Schultz et al. | | |
| 2014/0144908 A1* | 5/2014 | Bleile | ................... | B65D 88/08 220/4.16 |
| 2014/0319130 A1* | 10/2014 | Speciale | ................ | B65D 90/08 220/4.12 |

FOREIGN PATENT DOCUMENTS

| | | |
|---|---|---|
| DE | 2618318 A1 | 11/1977 |
| JP | 56115394 U | 9/1981 |
| KR | 100990076 B1 | 10/2010 |
| WO | 2009022923 A1 | 2/2009 |

\* cited by examiner

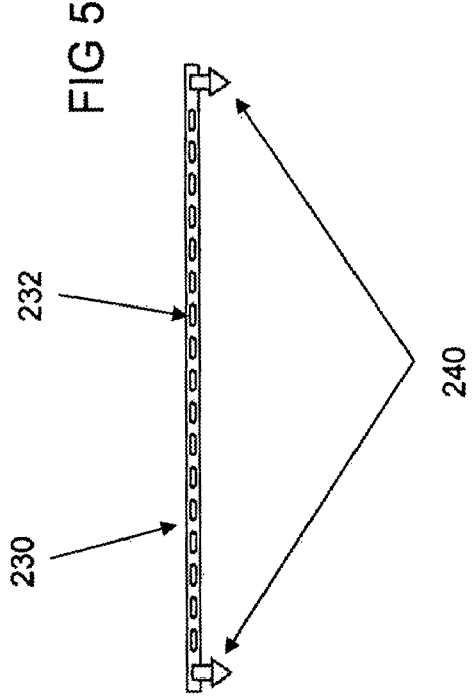
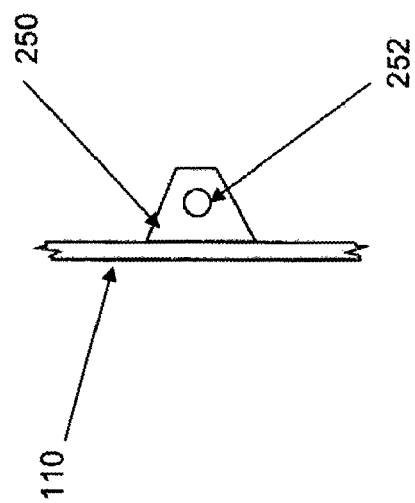

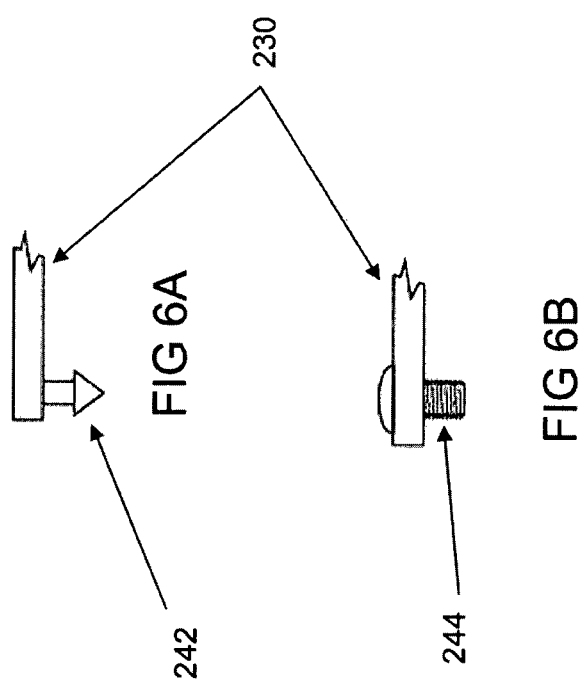

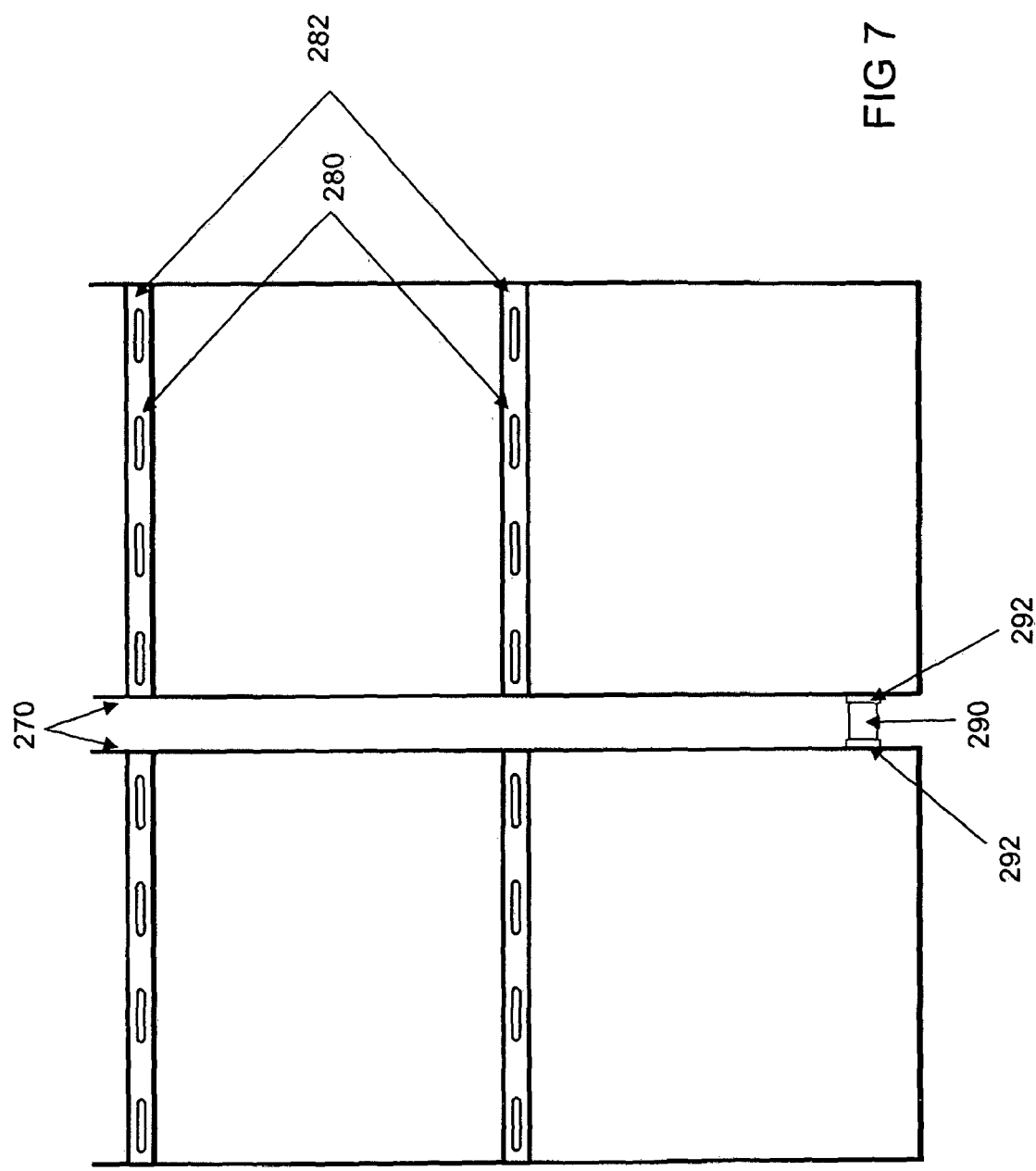

MODULAR TANKS

CROSS-REFERENCE TO RELATED APPLICATIONS

This application claims the benefit of PCT Application Serial No. PCT/AU2013/001455, filed Dec. 12, 2013, which in turn claims the benefit of Australian Patent Application Serial No. 2012905471, filed Dec. 12, 2012, and Australian Patent Application Serial No. 2013902634, filed Jul. 16, 2013.

FIELD OF THE INVENTION

The present invention relates to modular tanks. In particular, although not exclusively, the invention relates to flat pack modular tanks for deployment in a variety of locations and methods for constructing such modular tanks.

BACKGROUND TO THE INVENTION

Modular tanks are often used for the storage of liquids and in particular for the storage of water. Such tanks are supplied as a set of components that are delivered to and assembled on site. The modular configuration allows tanks to be more easily transported than regular storage tanks and enables tanks to be installed in places where there might not be sufficient access to install a regular storage tank.

Modular tanks in the prior art typically have a welded frame with a base, a top and wall panels mounted on the frame. The frame and wall panels are typically made of steel or stainless steel and therefore one problem with such tanks is that the frame needs to be welded together by skilled labourers on site during installation of the tank.

Another problem with at least some of the prior art metal tanks is that they have a complicated metal assembly structure which is heavy, can be costly to produce, time consuming to erect and requires one or more highly skilled workers to complete.

Another drawback of many of the prior art modular storage tanks is that they require a qualified plumber to complete the installation. Often modular tanks are installed in remote locations and qualified plumbers and/or skilled welders are not always readily available and add to the cost of installation.

Plastic storage tanks are provided in the prior art. However, these tanks are typically produced by rotational moulding as a unitary structure. Such tanks are difficult and expensive to manufacture and transport, especially in bulk, and cannot be installed in places where there is insufficient access, such as inside buildings.

OBJECT OF THE INVENTION

It is a preferred object of the present invention to provide a modular tank that addresses or at least ameliorates one or more of the aforementioned problems of the prior art and/or provides a useful commercial alternative.

SUMMARY OF THE INVENTION

Generally, embodiments of the present invention relate to modular tanks, and in particular to modular water tanks, kits for modular tanks and methods of construction of such tanks.

According to one aspect, but not necessarily the broadest aspect, the present invention resides in a frameless modular tank comprising,
 a cube comprising six substantially square wall modules; and
 a liner bag supported within the cube for the containment of liquid.

According to another aspect, but not necessarily the broadest aspect, the present invention resides in a modular tank comprising,
 a structure comprising a plurality of square wall modules;
 one or more struts within the structure connecting opposite wall modules to provide torsional stability to the tank and dividing the structure into a plurality of regions; and
 a liner bag supported within each region for the containment of liquid.

Preferably, the struts comprise a locking device to connect each strut to an aperture on an inside of one of the wall modules.

Suitably, the locking device is a self-tapped locking device and may be a screw-in locking device.

Preferably, each liner bag is joined to an adjacent liner bag to equalise the liquid pressure between the liner bags.

Preferably, each liner bag is joined to adjacent liner bags at a point near the bottom of the liner bag.

Preferably, each liner bag is joined to adjacent liner bags via a click together joint.

Preferably, each liner bag is joined to an adjacent liner bag via a dual flow valve.

Preferably, the liner bags are connected to an inlet and/or an outlet.

Preferably, the liner bags are connected to an overflow point.

Suitably, the liner bags are connected to a pump.

Preferably, each liner bag comprises a plurality of attachment devices to attach the liner to adjacent struts and/or to adjacent wall modules.

Preferably, the attachment devices are hooks.

Preferably, a square side of the wall modules is about 1 metre by about 1 metre.

Suitably, the wall modules are made from high impact food contact approved HDPE.

Suitably, the wall modules are made from 308 grade stainless steel.

Suitably, the wall modules are manufactured by injection moulding.

Suitably, the wall modules are made from UV stabilised HDPE to reflect a broad spectrum of electromagnetic radiation.

Suitably, the modular tank has a capacity of between 1 kilolitre and 1 megalitre.

According to a further aspect, but not necessarily the broadest aspect, the present invention resides in a flat pack kit comprising a plurality of square wall modules for the construction of a modular tank as described herein.

According to a yet further aspect, but not necessarily the broadest aspect, the present invention resides in a method of constructing a frameless modular tank comprising:
 building a structure of square wall modules; and
 attaching one or more liner bags within the structure for the containment of liquid.

According to another aspect, but not necessarily the broadest aspect, the present invention resides in a modular tank comprising:
 a plurality of curved wall modules coupled together; and a liner bag supported by the wall modules for the containment of liquid.

Suitably, the modular tank has a circular cross-section.

Preferably, the modular tank comprises a top module coupled to at least one of the wall modules and a base module coupled to at least one of the wall modules.

Preferably, the wall modules are coupled together via joining members.

Preferably, the joining members comprise one or more slots to receive edges of the wall modules having a complementary profile.

Suitably, the modular tank comprises one or more layers of wall modules.

Suitably, the joining members comprise arcuate members to couple adjacent layers of the wall modules together and vertical members to couple adjacent wall modules within each layer together.

Suitably, the arcuate members comprise one or more grooves to interlock the actuate members with the vertical members.

Suitably, one or more of the wall modules comprise a hole and the liner bag comprises one or more ports that protrude through the holes in the wall modules to support the liner bag.

Preferably, the curved wall modules comprise bars to strengthen the wall modules against bending and/or warping.

Suitably, the wall modules are manufactured via an extrusion process.

Suitably, the wall modules are manufactured by injection moulding.

According to a further aspect, but not necessarily the broadest aspect, the present invention resides in a method of constructing a modular tank, the method comprising:

coupling a plurality of curved wall modules together; and
supporting via the wall modules a liner bag for the containment of liquid.

Preferably, the wall modules are coupled together by sliding the edges of the wall modules into slots in one or more lateral sides of joining members.

Preferably, the method further comprises coupling a top module to at least one of the wall modules and coupling a base module to at least one of the wall modules.

Further aspects and/or features of the present invention will become apparent from the following detailed description.

BRIEF DESCRIPTION OF THE DRAWINGS

In order that the invention may be readily understood and put into practical effect, reference will now be made to embodiments of the present invention with reference to the accompanying drawings, wherein like reference numbers refer to identical elements. The drawings are provided by way of example only, wherein:

FIG. 4 is a side view of a fitting aperture of the tank shown in FIG. 2;

FIG. 5 is a side view of a strut used in the tank shown in FIG. 2;

FIGS. 6A and 6B show locking devices for the struts shown in FIG. 5;

FIG. 7 shows two liner bags of the tank coupled together;

Figure 1:
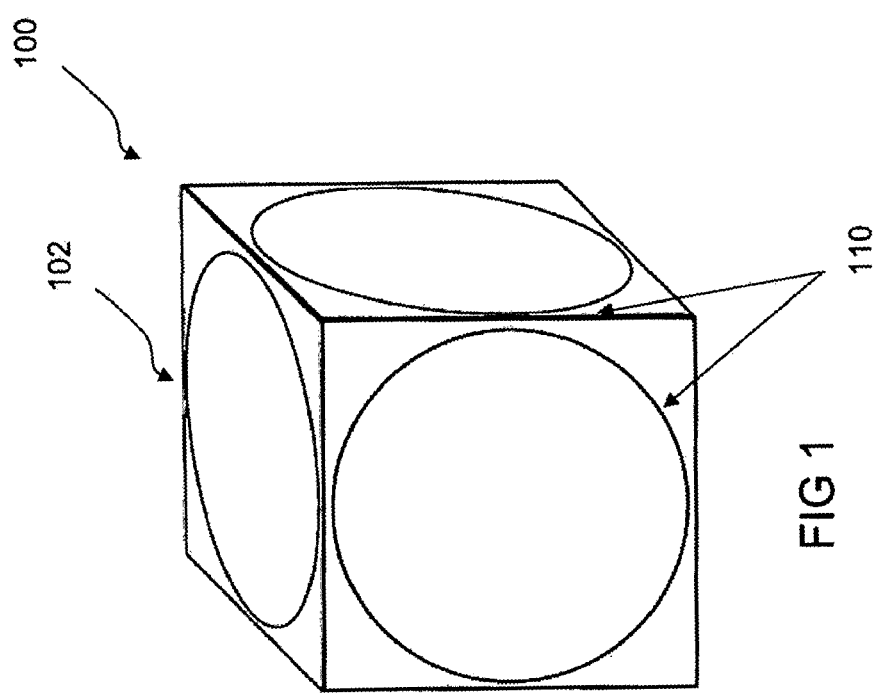
FIG. 1 is a perspective view of a frameless modular tank in accordance with one embodiment of the present invention.

Skilled addressees will appreciate that elements in the drawings are illustrated for simplicity and clarity and have not necessarily been drawn to scale. For example, the relative dimensions of some of the elements in the drawings may be distorted to help improve understanding of embodiments of the present invention.

DETAILED DESCRIPTION OF THE INVENTION

Embodiments of the present invention are directed to modular tanks, kits for constructing modular tanks, and in particular substantially flat packs, and methods for constructing and installing modular tanks. Whilst the modular tanks of the present invention can be used for storing any liquid, the modular tank of the present invention is particularly suited to storing water.

FIG. 1 illustrates a modular tank 100 according to one embodiment of the present invention. The modular tank is frameless and is in the form of a cube 102 comprising six square wall modules 110 forming the base, the top and four sides of the cube 102. The square wall modules 110 are coupled together using any suitable known connection means that do not require particular expertise or specialized tools to use. As described in further detail herein, the modular tank 100 comprises one or more liners, such as a liner bag supported within the cube for the containment of liquid. In some embodiments the liner comprises hooks to support the liner within the modular tank.

Figure 2:
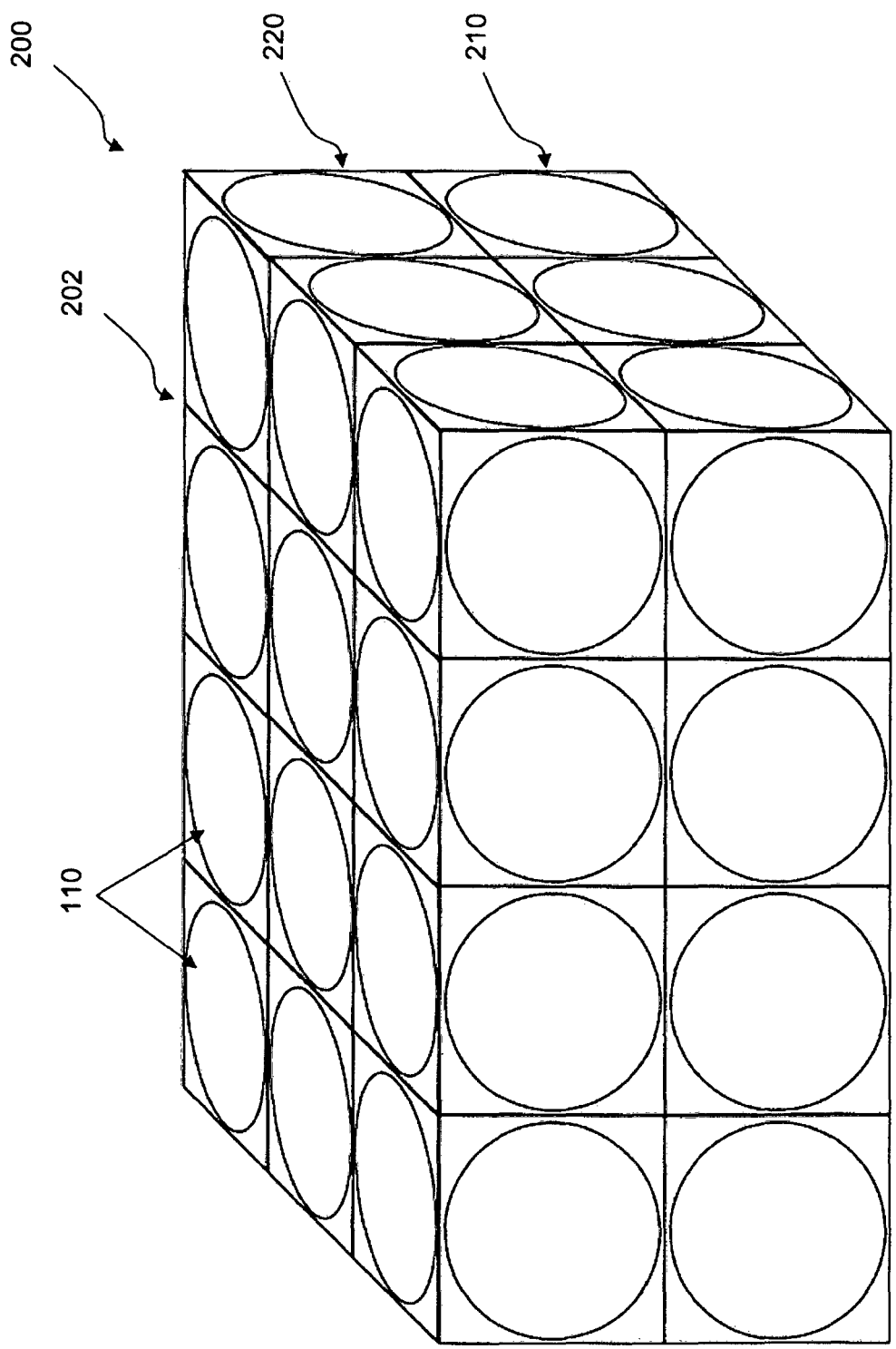
FIG. 2 is a perspective view of a frameless modular tank constructed from multiple modules shown in FIG. 1.

FIG. 2 illustrates a modular tank 200 according to another embodiment of the present invention. The modular tank 200 comprises a structure 202 constructed with multiple square wall modules 110 of the type shown in FIG. 1. The modular tank 200 can be scaled in length, width and height to build a larger or smaller modular tank than the tank shown in FIG. 2 with a larger or smaller number of rows or columns of square modules. The structure 202 can be considered to comprise a first layer 210 and a second layer 220. The modular tank 200 can be a cuboid shape and can have a capacity of for example between about 1 kilolitre and about 1 megalitre. A square side of one of the wall modules 110 shown in FIG. 2 is typically 1 metre by 1 metre. However, it will be appreciated that the present invention is not limited by the dimensions of the modular tank 100, the modular tank 200, the square wall modules 110 and/or the capacity of the tank.

In preferred embodiments, the wall modules 110 shown in FIGS. 1 and 2 are made from high impact food contact approved high-density polyethylene (HDPE). In other embodiments, the wall modules 110 are made from metal and in particular from 308 grade stainless steel, although other metal can be used. Where the wall modules 110 are made from HDPE, the wall modules 110 can be manufactured by injection moulding using moulds designed to provide easy self-assembly, strength and scalability of the modular tank 200. The wall modules 110 can be made from UV stabilised HDPE to reflect a broad spectrum of electromagnetic radiation which would otherwise be absorbed by the modular tank 200. Reflecting a broad spectrum of electromagnetic radiation from the modular tank 200 reduces the degradation of the wall modules and thus extends the life of the tank and results in lower liquid temperatures. When the liquid is water this results in improved water quality and reduced algal growth within the tank.

Figure 3:
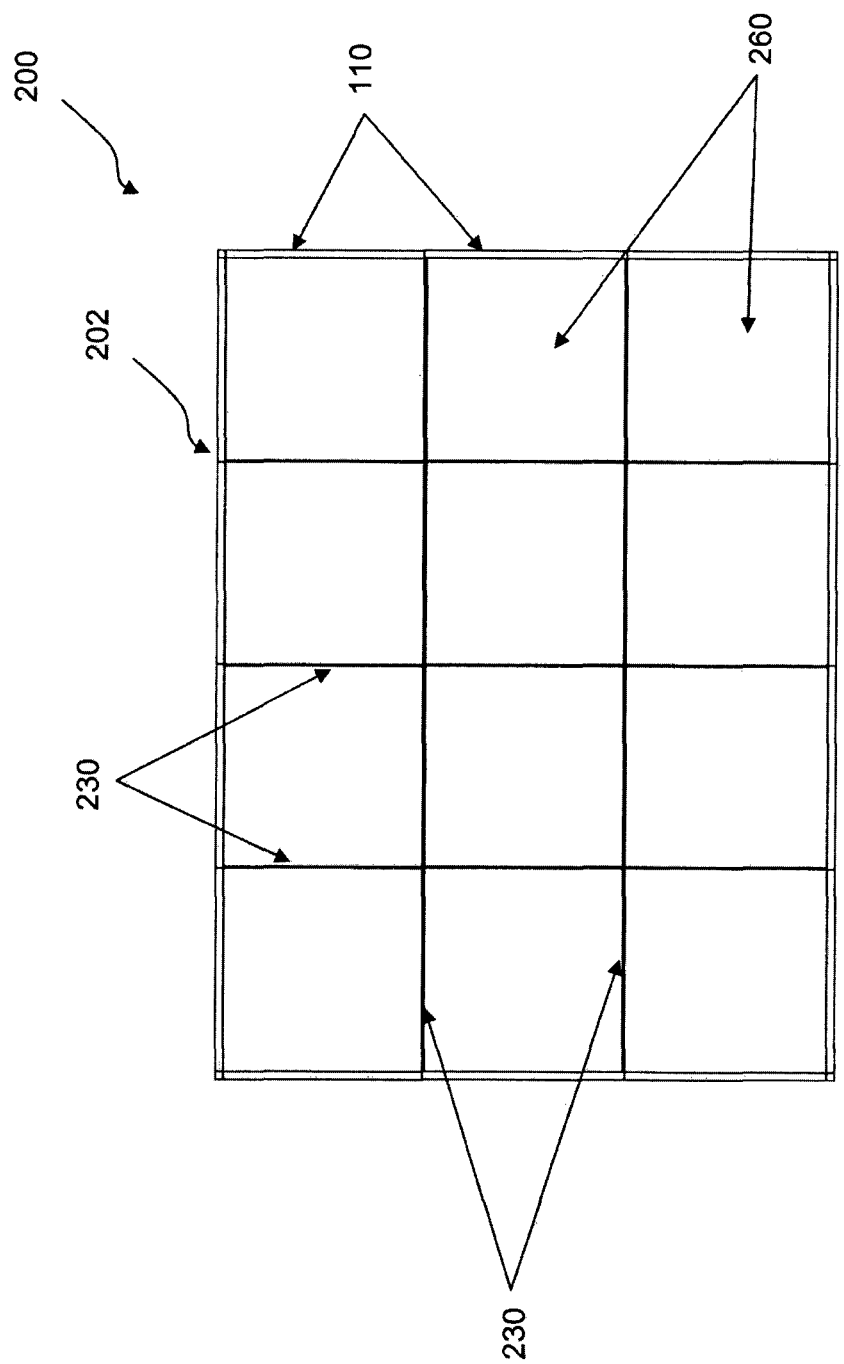
FIG. 3 is a cross-sectional plan view of the frameless modular tank shown in FIG. 2.

FIG. 3 illustrates one or more struts 230 within the structure 202 connecting opposite wall modules 110 to provide torsional stability to the modular tank 200. The struts 230 connect opposing wall modules 110 horizontally and in some embodiments can also connect opposing wall modules 110 vertically. The struts 230 can be evenly spaced with one strut 230 connected to each wall module 110, typically at the top of the wall module 110. The struts 230 within the structure 202 divide the structure 202 into a plurality of regions 260. The struts 230 are typically at the top of each layer 210, 220.

The struts 230 can be provided in a range of lengths corresponding to the side lengths of different sized modular tanks. For example, a strut for connecting opposing sides of a modular tank that is three wall modules wide and has 1 metre by 1 metre wall modules would be 3 metres long.

FIG. 4 illustrates a wall module 110 comprising an inwardly extending bracket 250 in which an aperture 252 is provided for attaching one end of the strut 230.

FIG. 5 illustrates a strut 230 comprising a locking device 240 provided at or near each end of the strut 230, to connect the strut to the aperture 252 on the wall module 110.

FIGS. 6A and 6B illustrate two alternative locking devices that can be used with the struts 230. The locking device can be a self-tapped locking device 242 as shown in FIG. 6A or the locking device can be a screw-in locking device 244 as shown in FIG. 6B. Both types of locking device provide quick and easy assembly of the tank.

FIG. 7 illustrates two liners of the modular tank 100 and in this embodiment the liners are in the form of liner bags 270. A liner bag 270 is supported within each region 260 of the tank for the containment of liquid. Each liner bag 270 comprises one or more attachment devices 280 to attach the liner bag 270 to the adjacent struts 230 and/or wall modules 110 to support the liner bag within the region 260. Typically, the attachment devices 280 are hooks or clips coupled to the liner bag, although other attachment devices are envisaged. The struts 230 also comprise attachment points 232 where the hooks or clips of the liner bag 270 are attached. The liner bag 270 can comprise reinforced or strengthened regions 282 at the attachment devices 280, which adds to the stability of the structure 202. The liner bags may vary in size depending on the length, width and height of the modular tank 202. For example, in a modular tank that is 2 metres high and has 1 metre by 1 metre wall modules, the liner bags 270 would be approximately 2 metres by 1 metre by 1 metre. In preferred embodiments the liner or liner bags are made of PVC.

Each liner bag 270 is joined to an adjacent liner bag 270 to equalise the liquid pressure between the liner bags 270. The liner bags 270 are typically joined to adjacent liner bags 270 at a point near the bottom of the liner bag 270 to ensure the flow of liquid between the liner bags 270. Each liner bag 270 is joined to adjacent liner bags 270 via a click together joint 290. The click together joints 290 allow easy connection of the liner bags 270 to one another during installation and do not require a specialist to install. The click together joint 290 may be any standard known click together joint. The liner bags 270 can also comprise a dual flow valve 292 in the joint 290 or at the point where the liner bag 270 connects to the joint 290 to allow fluid flow in both directions. Alternatively, the liner bags 270 comprise a seal when the joint 290 is not connected.

The liner bags 270 are connected to an inlet and/or an outlet of the modular tank 200 to allow to input or removal of liquid. The liner bags may also be connected to an overflow point and/or a pump if a pump is used with the modular tank.

The modular tank of the present invention can be provided as a flat pack kit. The flat pack kit comprises a plurality of square wall modules for the construction of the modular tank as described herein.

The present invention can also comprise a method of constructing the frameless modular tank. The method comprises building a structure of square wall modules 110 and attaching one or more liner bags 270 within the structure for the containment of liquid. The liner bags 270 can be attached to the structure by hooks or clips or other attachment devices. The structure can be built by connecting the square modules directly to one another.

Figure 8:
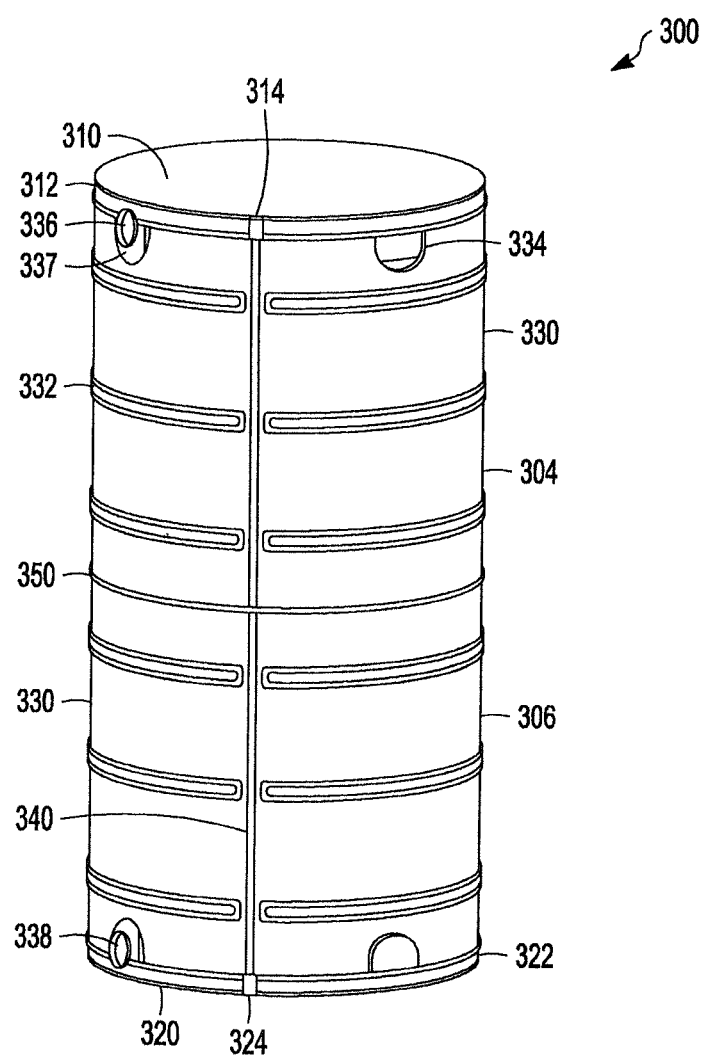
FIG. 8 is a perspective view of a modular tank having a circular cross-section in accordance with another embodiment of the present invention.

FIG. 8 illustrates a modular tank 300 according to another embodiment of the present invention. The modular tank 300 comprises a plurality of curved wall modules 330 coupled together. One or more liners, such as a liner bag 270 as described in relation to the previous embodiment, is supported by the wall modules 330 for the containment of liquid, such as water. The tank shown in FIG. 8 has a circular cross-section. However, tanks of other shapes can be constructed depending on the curvature of the wall modules 330, the orientation of the wall modules 330 and the number of wall modules used. For example, embodiments of the modular tank 300 can have an elliptical cross-section.

The modular tank 300 comprises a top module 310 coupled to at least one of the upper wall modules 330 and a base module 320 coupled to at least one of the lower wall modules 330. In this embodiment, the curved wall modules 330 are square or rectangular wall modules, and the top module 310 and the base module 320 have a round or circular shape. The wall modules 330 are coupled together via joining members 340, 350, which are described in more detail with reference to FIGS. 9 and 10.

Each wall module 330 comprises one or more bars or ribs 332 to strengthen the wall modules 330, for example, against warping, flexing, buckling or bending. The bars or ribs 332 can protrude outwardly from the wall modules 330 and can be moulded integrally with the wall modules 330.

The modular tank 300 can comprise one or more layers of wall modules 330. The modular tank 300 can be scaled to build larger or smaller modular tanks with a larger or smaller number of layers of wall modules 330 than the modular tank 300 shown in FIG. 8. The modular tank can comprise two layers of wall modules 330, one layer on top of the other, as shown in FIG. 8, a single layer of wall modules 330, or three or more layers of wall modules 330. The modular tank 300 shown in FIG. 8 comprises four wall modules 330 in each layer. However, the modular tank 300 can be designed with a larger or smaller number of wall modules 330 in each layer. In the embodiment shown in FIG. 8, the top module 310 is coupled to a top layer 304 of the wall modules 330 and the base module 320 is coupled to a bottom layer 306 of the wall modules 330.

The joining members 340, 350 comprise vertical members 340 to couple the wall modules 330 within each layer. The joining members also comprise arcuate members 350 to couple the wall modules 330 of adjacent layers. The arcuate members 350 have the same or similar curvature to the curvature of the wall modules 330. The arcuate members 350 also couple to the vertical members 340 and to each other. For example, the arcuate members 350 can interlock with the vertical members 340 and with each other. The joining members can comprise one or more slots, typically in one or more lateral sides of the joining members, to receive edges of the wall modules having a complementary profile, as described in more detail hereinafter.

As shown in FIG. 8, each of the top module 310 and the base module 320 comprise a lip 312, 322 to couple the top module 310 and the base module 320 to the respective adjacent wall modules 330. Each lip 312, 322 is between about 10 mm and about 50 mm high, and preferably about 20 mm or about 40 mm high. The wall modules 330 can comprise clips 334 to couple the wall modules 330 to the corresponding lip 312, 322. Each lip 312, 322 comprises one or more channels 314, 324 to receive the vertical members 340. One of the channels 324 is shown in more detail in FIG. 9 and described further below.

One or more wall modules 330 can comprise a hole 336, 388 to enable a liquid, such as water, to flow into or out of the modular tank 300. The wall modules 330 comprising the hole 336 in the top layer 304 of the tank are oriented such that the hole 336 is near the top of the modular tank 300. The wall modules 330 comprising the hole 338 in the bottom layer 306 of the tank are oriented such that the hole 338 is near the bottom of the modular tank 300.

The liner comprises ports that protrude through the holes 336,338 to enable the liquid, such as water, to flow into or out of the liner. The ports that protrude through the holes 336 near the top of the modular tank 300 comprise an inlet port and an overflow port. The ports are secured to the wall modules 330 via fittings 337 to support and/or secure the liner stably within the modular tank 300 regardless of whether the liner is full or empty. The fittings 337 are typically external to the modular tank 300. In some embodiments, the fittings 337 screw the ports to the wall modules 330.

A port that protrudes through the hole 338 near the bottom of the modular tank 300 can be used as an outlet and/or can provide interconnection between multiple modular tanks 300, for example, to equalise the water pressure between the modular tanks 300. The ports and/or holes 338 of multiple modular tanks 300 can be connected using pipes, hoses, joiners and/or splitters known in the art. Typically, each modular tank 300 has a maximum operating pressure of around 5 bar.

In preferred embodiments, the top of the liner, such as a liner bag, is closed. However, in alternate embodiments, the top of the liner is open. In some embodiments, the liner comprises one or more attachment devices, such as hooks or clips to support the liner within the modular tank 300. In some embodiments, the liner overlaps the top of the wall modules 330 and is secured and/or supported by the lip 312.

In some embodiments, the modular tank 300 can be a cylindrical shape. The wall modules 330 are preferably about 1 m high and about 0.9 m wide. The modular tank 300 typically has a horizontal cross sectional area of about 1 m$^2$. The modular tank 300 typically has a capacity of between about 1,000 litres and about 3,000 litres.

In some embodiments, the wall modules 330 are up to about 2 m high by about 2 m wide when extruded rather than injection molded.

Figure 9:
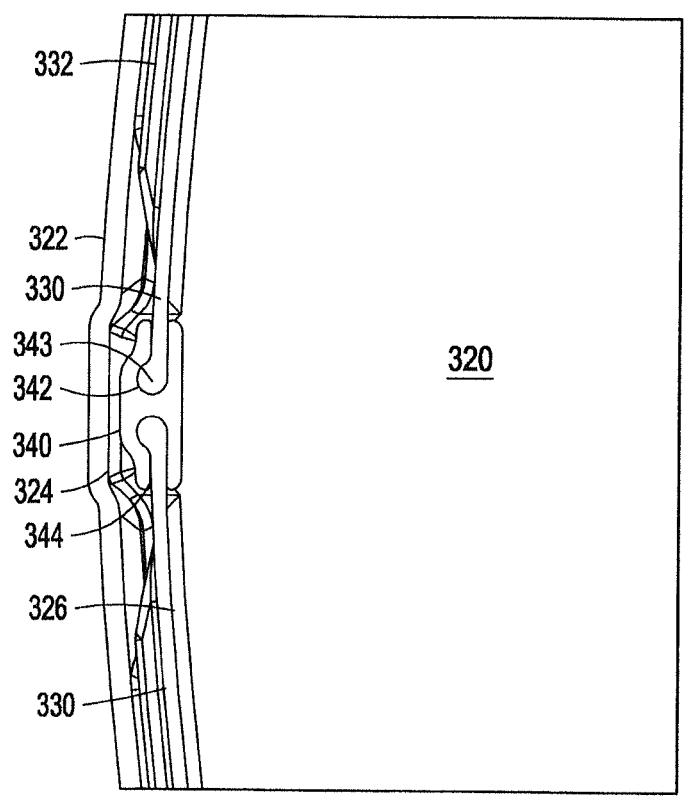
FIG. 9 is a top view of a vertical member joining together adjacent modules of the modular tank shown in FIG. 8.

FIG. 9 shows a plan view of one of the vertical members 340 joining together two wall modules 330 of the modular tank 300. The vertical member 340 is elongate and typically around 1 m long, but the length will depend upon the size of the wall modules 330 to be coupled together. The vertical member 340 comprises one or more slots 342, along one or more lateral edges of the vertical member 340 to receive the wall modules 330 and thereby couple the wall modules 330 together. One or more edges 343 of the wall modules 330 have a complementary profile to the slots 342 to enable the vertical member 340 to be slid onto the wall modules 330 or vice versa. The slots 342 narrow toward an opening 344 at one or more lateral edges of the vertical member 340 to prevent the edges 343 of the wall modules from being withdrawn from the slots 342 and thus to secure the wall modules 330 to the vertical member 340.

The base module 320 comprises one or more ridges 326 to secure the wall module 330 to the base module 320. In some embodiments, the ridges 326 enable the base module 320 to clip onto the edges 343 of the wall modules 330. For example, the ridges 326 can create a recess with a complementary profile to the edges 343 of the wall modules 330. The top module 310 can comprise similar ridges 326. The bars or ribs 332 which strengthen the wall modules 330 protrude from a surface of the wall modules 330 in a direction away from a centre of the modular tank 300.

Figure 10:
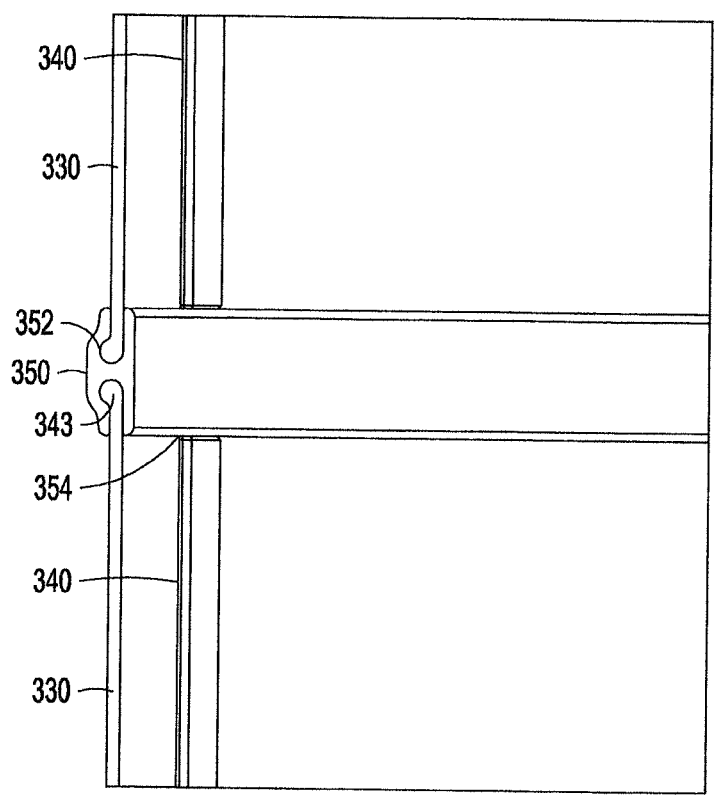
FIG. 10 is a perspective cross-sectional view of vertical and arcuate members joining together modules of the modular tank shown in FIG. 8.

FIG. 10 shows one of the arcuate members 350 coupling adjacent layers of wall modules 330 of the modular tank 300. The arcuate member 350 comprises one or more slots 352, typically along one or more lateral edges of the arcuate member 350, to receive the wall modules 330 and thereby couple the wall modules 330 together. One or more edges 343 of the wall modules 330 have a complementary profile to the slots 352 to enable the edges 343 of the wall modules 330 to be slid into the slots 352. The slots 352 narrow toward an opening at one or more lateral edges of the arcuate member 350 to secure the wall modules 330 to the arcuate member 350. The arcuate member 350 further comprises one or more grooves 354 to receive the vertical members 340 to interlock the arcuate member 350 with the vertical members 340.

The modular tank 300 can be constructed by coupling the plurality of curved wall modules 330 together and supporting via the wall modules 330 a liner or liner bag 270 for the containment of liquid. The wall modules 330 are coupled together by sliding the edges 343 of the wall modules 330 into the slots 342, 352 in one or more of joining members 340, 350. The top module 310 is coupled to at least one of the wall modules 330 and the base module 320 is coupled to at least one of the wall modules. The wall modules 330 are coupled together by first sliding the edges 343 of the wall modules 330 onto the arcuate members 350, then sliding the vertical members 340 onto the wall modules 330 and interlocking the vertical members 340 with the arcuate members 350 via the groove 354. The top module 310 and the base module 320 can be clipped onto the adjacent layer of wall modules 330 via the clips 334 and/or the ridge 326.

Figure 11:
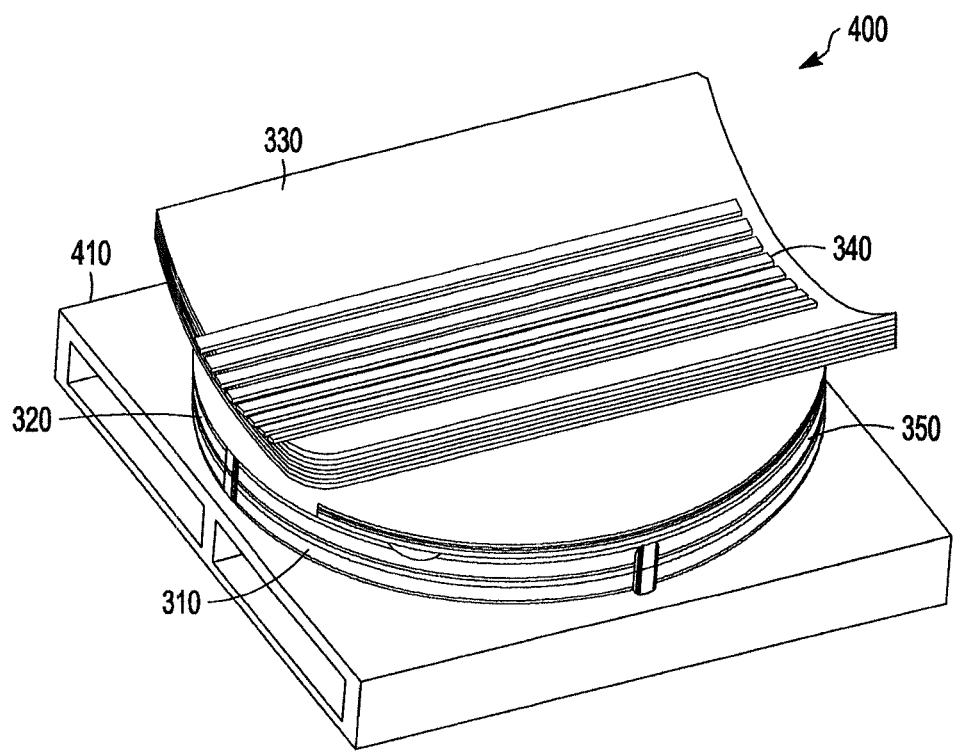
FIG. 11 is a perspective view of a shipping configuration for the components of the modular tank shown in FIG. 8 in kit form.

FIG. 11 is a perspective view of a compact shipping configuration 400 for the modular tank 300 in the form of a kit. The shipping configuration enables simple and efficient transportation of the modular tank 300, for example, on a shipping pallet 410. The shipping configuration 400 comprises end modules in the form of the top and base modules 310, 320 stacked on top of one another and the arcuate members 350 inside the lip 312, 314 of one or more of the end modules 310, 320. The wall modules 330 are stacked on top of the upper end module 320 and the vertical members 340 sit within the curve of the wall modules 330. The bars or ribs 332 help prevent the curved wall modules 330 from flattening, such as during transport or use.

Figure 12:
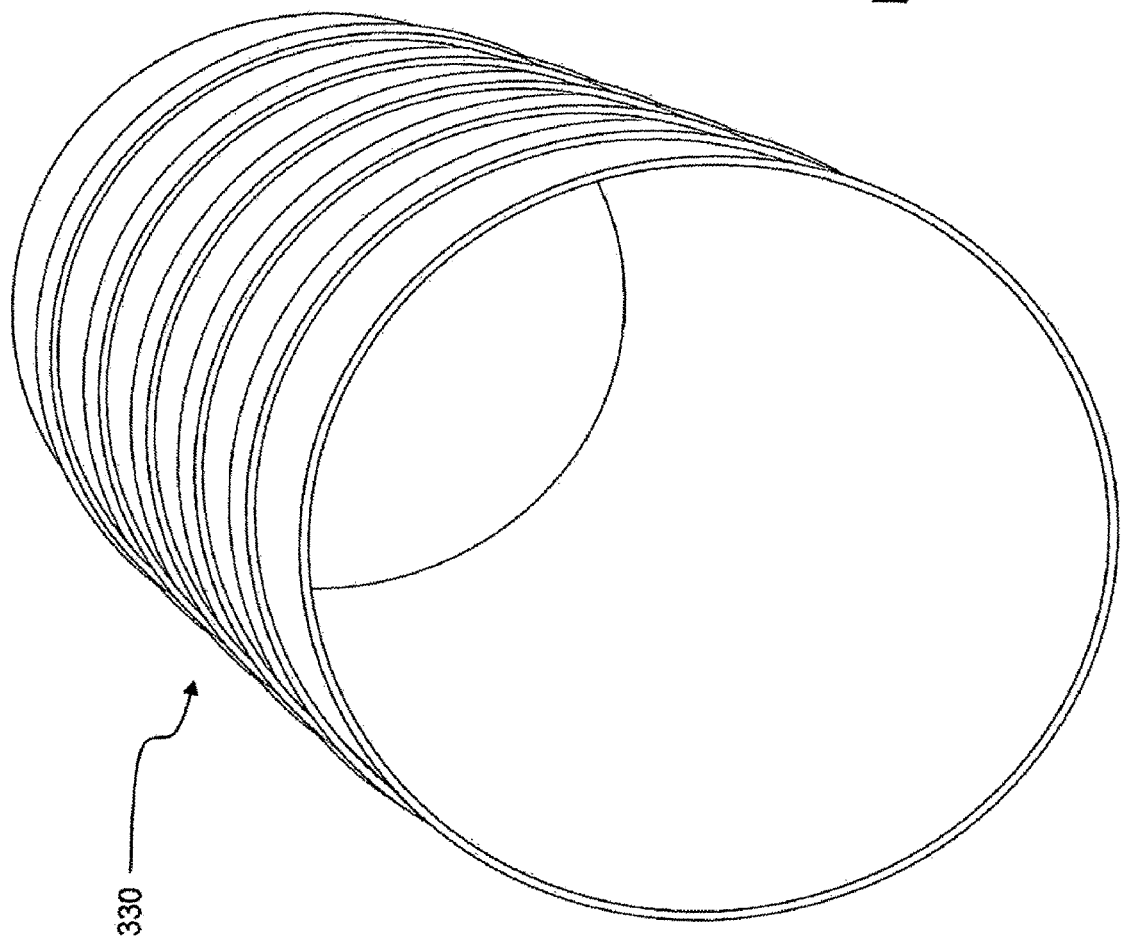
FIG. 12 is a perspective view of a wall module for a modular tank according to another embodiment of the present invention.
Figure 13:
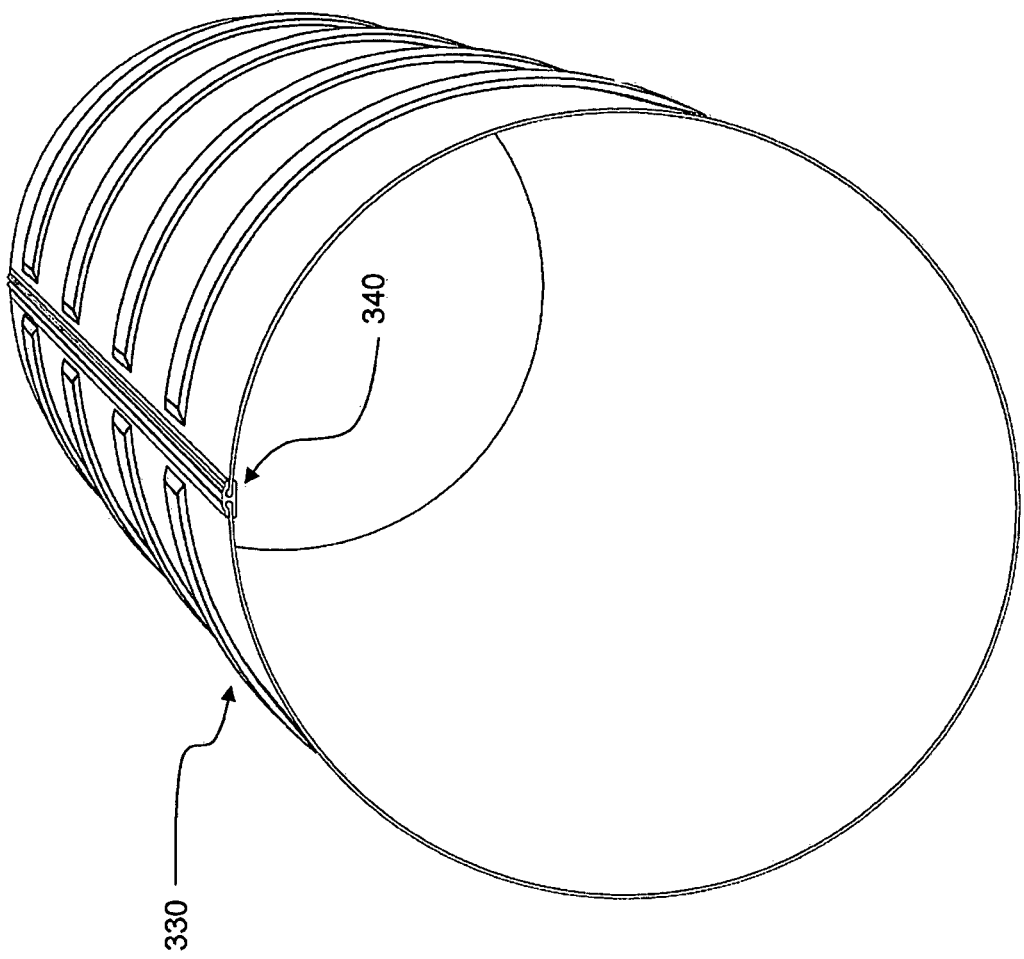
FIG. 13 is a perspective view of a wall module for a modular tank according to further embodiment of the present invention.

In some embodiments, one or more of the layers of wall modules comprise a single wall module 330 as shown in FIGS. 12 and 13. In the embodiment shown in FIG. 12, the single wall module 330 is moulded or extruded in a shape of a layer of the tank. Alternatively, as shown in FIG. 13, opposing vertical edges of the wall module 330 are coupled together via a vertical member 340. Therefore, it is envisaged that in some embodiments the tank 300 can be constructed from a single wall module curved into shape and having two edges of the single wall module joined together. In these embodiments, the width of the wall module 330 is greater, for example, about 3.6 m wide.

Figure 14:
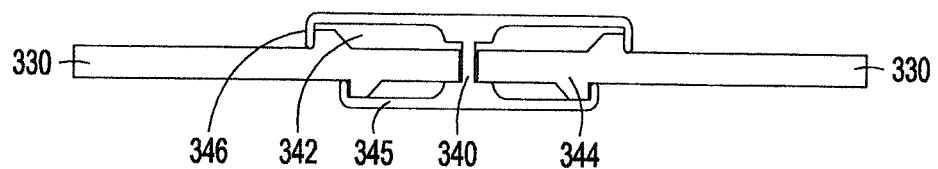
FIG. 14 is a top cross-sectional view of two wall modules coupled together via a joining member according to further embodiment of the present invention.
Figure 15:
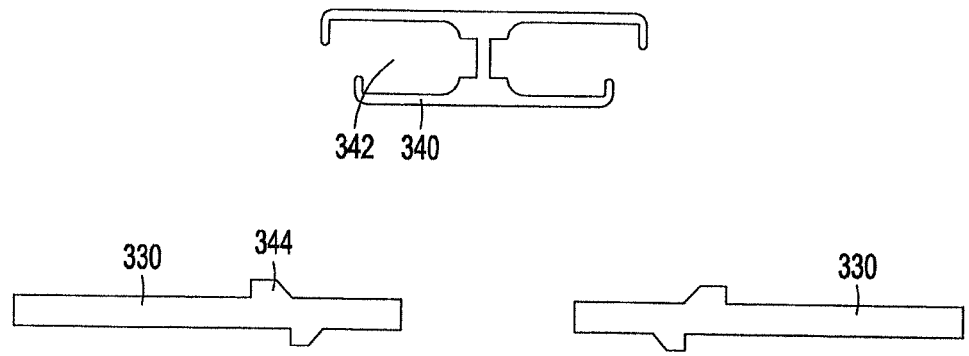
FIG. 15 is a top cross-sectional view of the two wall modules and the joining member shown in FIG. 14.

FIGS. 14 and 15 are top cross-sectional views of two wall modules 330 and a joining member 340 according to some embodiments of the present invention. The wall modules 330 can be slid into the slots 342 of the joining members as shown in FIG. 14. The wall modules 330 comprise two offset protrusions 344 near the end of the wall module on opposing faces of the wall module 330. The protrusions 344 each comprise a face that is substantially perpendicular to the wall module 330 and oriented away from the end of wall module and an angled face that is sloped toward the end of the wall module 330. The joining member 340 comprises a short hooked flange 345 and a long hooked flange 346 on either side of the joining member 340. The short hooked flange 345 and the long hooked flange 346 are configured parallel to one another and hook toward one another. The shape of the flanges 345, 346 complements the shape of the protrusions 344. The protrusions and the flanges are configured to enable tighter packing of the wall modules 330 and the joining members 340 during shipping.

In preferred embodiments, the wall modules 330 shown in FIGS. 8 to 15, are made from high impact food contact approved high-density polyethylene (HDPE) and manufactured by injection moulding. In some embodiments the wall modules 330 can be made via injection moulding at a rate of one wall module per minute. In alternative embodiments, the wall modules 330 shown in FIGS. 8 to 15 are made via an extrusion process which enables the production of larger wall modules whilst maintaining the stability of each wall module.

The wall modules 330 can be made from UV stabilised HDPE to reflect a broad spectrum of electromagnetic radiation which would otherwise be absorbed by the modular tank 300. The holes 336,338 can be provided in the mould for injection moulding, or drilled or cut into the wall modules 330 after the injection moulding or extrusion.

The present invention thus addresses or at least ameliorates one or more of the aforementioned problems of the prior art in that the present invention provides an improved modular tank that can be deployed in a variety of locations in a cost-effective and time-effective manner using relatively un-skilled labour for erection and installation of the tank. Moreover, the present invention can be assembled using basic tools such as ladders, ropes and rubber mallets, negating the need for complex/specialist tools during installation. In smaller projects the modular tank of the present invention can therefore be installed without the need for qualified tradespeople, thus saving time and money.

Furthermore, embodiments of the modular tank can be made via injection molding or extrusion resulting in reduced production times per wall module and therefore faster production times per tank. The injection molding or extrusion provides simpler and less expensive production than rotational moulding and enables the tanks to quickly and easily be made in bulk.

The modular tank can be made of plastic, such as HDPE, which is lighter than steel tanks in the prior art. This enables the tanks to more easily be transported, especially in bulk, and to be installed more easily. For example, the modular tanks of the present invention can be supplied as a flat pack and easily be deployed into locations that have limited access, such as inside buildings or in remote locations.

The modular tank 300 can be assembled by a simpler and faster method than prior art tanks and can be assembled without the use of tools.

The design of the tank and the material used in the tank and liner modules make the tanks suitable for storage and/or transportation of a range of liquids, including water, food, such as honey, olive oil or milk, and for chemical storage.

The liner bags of the modular tank are designed to complement the wall modules for ease of installation. The liner bags are designed for longevity and strength.

The cylindrical modular tank 300 has a lower operating pressure than most square modular tanks, which provides the benefit of improved safety and better compliance with pressure standards.

In this specification, the terms "comprises", "comprising" or similar terms are intended to mean a non-exclusive inclusion, such that an apparatus that comprises a list of elements does not include those elements solely, but may well include other elements not listed.

The reference to any prior art in this specification is not, and should not be taken as, an acknowledgement or any form of suggestion that the prior art forms part of the common general knowledge.

Throughout the specification the aim has been to describe the invention without limiting the invention to any one embodiment or specific collection of features. Persons skilled in the relevant art may realize variations from the specific embodiments that will nonetheless fall within the scope of the invention.

The invention claimed is:

1. A modular tank comprising:
a plurality of curved wall modules coupled together via a plurality of separate joining members, the joining members comprising two slots, each slot comprising a short hooked flange and a long hooked flange configured parallel to one another a hook of the short hooked flange hooking toward a hook of the long hooked flange and the hook of the long hooked flange hooking toward the hook of the short hooked flange, each slot configured to receive an edge of one of the wall modules, the edge of the wall module having a complementary profile comprising two offset protrusions offset with respect to each other on opposing faces of the wall module near an end of the wall module, wherein the offset protrusions each comprise a face that is substantially perpendicular to the wall module and oriented away from the end of the wall module to abut the hooks of the short hooked flange and the long hooked flange, and an angled face that is sloped toward the end of the wall module; and
a liner bag supported by the wall modules for the containment of liquid.

2. The modular tank of claim 1, wherein the modular tank comprises a top module coupled to at least one of the wall modules and a base module coupled to at least one of the wall modules.

3. The modular tank of claim 1, wherein the modular tank comprises one or more layers of the wall modules.

4. The modular tank of claim 1, wherein the joining members comprise arcuate members to couple adjacent layers of the wall modules together and vertical members to couple adjacent wall modules within each layer together.

5. The modular tank of claim 4, wherein the arcuate members comprise one or more grooves to interlock the arcuate members with the vertical members.

6. The modular tank of claim 1, wherein one or more of the wall modules comprise a hole and the liner bag comprises one or more ports that protrude through the one or more holes in the wall modules to support the liner bag.

7. The modular tank of claim 1, wherein the curved wall modules comprise one or more bars or ribs to strengthen the wall modules against bending and/or warping.

8. The modular tank of claim 1, wherein the modular tank has a circular cross-section.

9. A method for constructing a modular tank, the method comprising:
coupling a plurality of curved wall modules together via a plurality of separate joining members, the joining members comprising two slots, each slot comprising a short hooked flange configured parallel to a long hooked flange to receive an edge of one of the wall modules, a hook of the short hooked flange hooking toward a hook of the long hooked flange and the hook of the long hooked flange hooking toward the hook of the short hooked flange, the edge of the wall module having a complementary profile comprising offset protrusions offset with respect to each other on opposing faces of the wall module near an end of the wall module, wherein the protrusions each comprise a face that is substantially perpendicular to the wall module and oriented away from the end of the wall module to abut the hooks of the short hooked flange and the long hooked flange, and an angled face that is sloped toward the end of the wall module; and
supporting via the wall modules a liner bag for the containment of liquid.

10. A modular tank comprising a curved wall module, wherein opposing vertical edges of the curved wall module are coupled via a separate joining member, the joining member comprising two slots, each slot comprising a short hooked flange configured parallel to a long hooked flange to receive one of the opposing vertical edges of the curved wall module, a hook of the short hooked flange hooking toward a hook of the long hooked flange and the hook of the long hooked flange hooking toward the hook of the short hooked flange, the vertical edge of the wall module having a complementary profile comprising offset protrusions offset with respect to each other on opposing faces of the wall module near an end of the wall module, wherein the offset protrusions each comprise a face that is substantially perpendicular to the wall module and oriented away from the end of the wall module to abut the hooks of the short hooked flange and the long hooked flange, and an angled face that is sloped toward the end of the wall module, and a liner bag supported by the wall module for the containment of liquid.

11. The modular tank of claim 1, wherein the wall modules are made from a material selected from one of the following: HDPE; stainless steel.

12. The method of claim 9, wherein the wall modules are manufactured by injection moulding or via an extrusion process.

13. The modular tank of claim 1, wherein the modular tank has a capacity of between 1 kilolitre and 1 megalitre.

* * * * *